Aug. 18, 1931.  F. H. OWENS  1,819,476

LENS MOUNT

Filed June 25, 1930

INVENTOR.
FREEMAN H. OWENS.
BY
ATTORNEY.

Patented Aug. 18, 1931

1,819,476

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

LENS MOUNT

Application filed June 25, 1930. Serial No. 463,667.

This invention relates to a lens mount and particularly to a mounting and locking device for photographic lenses.

The primary object of my invention is to provide an adjustable lens mount for focusing and simple, effective and easily operable means for locking the lens mount in its adjusted position.

Another object of my invention is to provide a lens mount of this character, with means whereby the indicating means for the focusing portions of the mount may be adjusted to accommodate lenses which may vary slightly in focal length.

It is well known that in the manufacture of photographic lenses of any given or desired focal length, it is practically impossible to grind a large quantity of such lenses all having the exact perfect focal length as desired. There is a slight variation and in order to compensate therefor, I have provided a lens mount which is provided with an adjustable setting means which can accommodate any such slight variations in focal length of the lenses to be mounted therein.

It is also well known in the photographic art, and particularly in the motion picture art, that cameras equipped with focusing lenses must be readily adjustable to proper focus and provided with means for locking the adjustment so as to preserve and maintain it during the taking of the motion picture, during which time the camera is often moved from one position to another. It is therefore, an object of my invention to provide such a locking means which the operator can manipulate instantly and with ease, promptly upon completing his focusing adjustment.

Other objects and advantages in details of construction and operation, will appear as the description proceeds, reference now being had to the figures of the accompanying drawings, forming a part of this application and wherein like reference numerals indicate like parts.

In the drawings:—

Figures 1, 2:
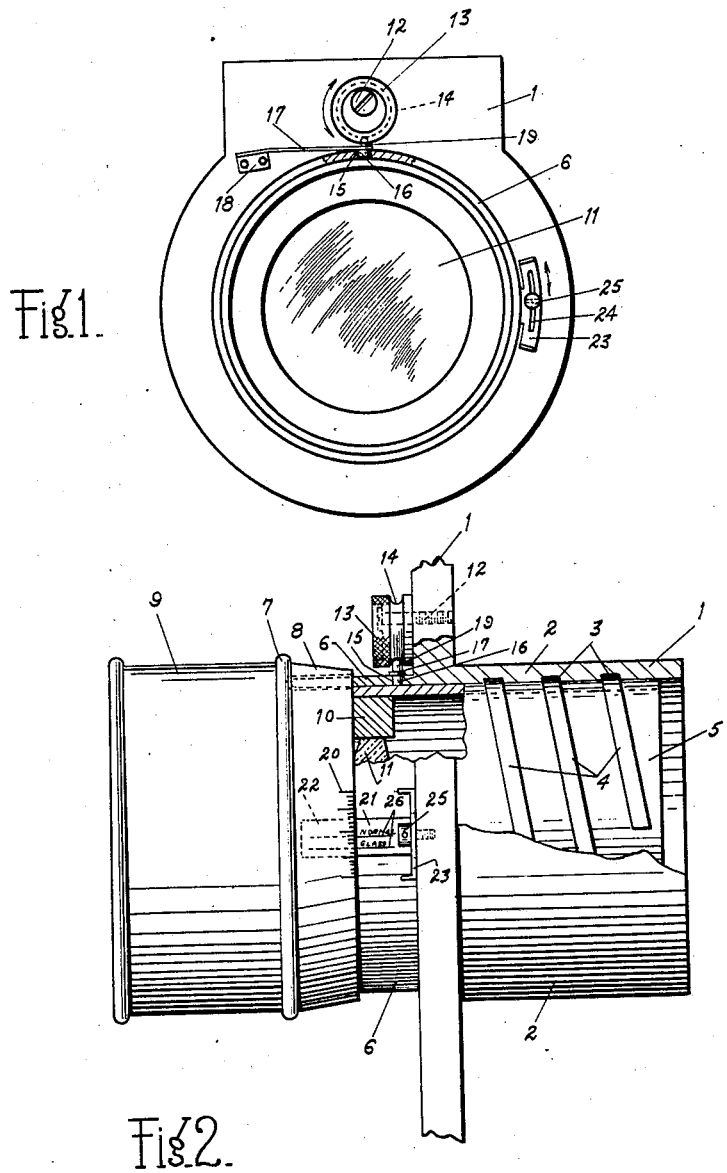
Figure 1 is a front view of my improved lens mount, certain parts being in section for clearness of illustration.
Figure 2 is a side view thereof, certain parts here also being shown in section for clearness.

The reference character 1 refers to a support which may constitute the front wall of a camera upon which this device is mounted.

Extending rearwardly of the supporting wall 1 is a tubular supporting barrel 2, threaded internally as at 3, to receive the thread 4 of the hollow tubular lens mount or holder 5, which is rotatable within the barrel 2, and adjustable longitudinally therein by virtue of the screw threading connection 3 and 4.

The hollow barrel member 2 extends forwardly of the supporting wall also, as at 6, for a short distance to provide additional bearing supports for the lens mount or holder 5.

Suitably secured to the forwardly extending end of the lens holder 5 is an operating ring or finger piece 7 by means of which the mount or holder 5 may be rotated. This ring 7 is provided with a rearwardly extending flange 8 overlying the forwardly extending end 6 of the barrel 2. This flange 8 is provided with a plurality of indicating or scale marks representing distance, for use in focusing the device in a manner to be described.

Suitably mounted upon the lens mount in a manner not shown, and forming no part of this invention, is a ring 9 constituting the diaphragm setting means for the lens.

Suitably secured within the mount or holder 5, as by means of the ring or block 10 is a lens 11.

Carried by the supporting wall 1 directly above the barrel 2, is a pin or screw 12 extending forwardly of the wall and eccentrically mounted for rotation upon this pin 12 is a finger piece 13 provided with a groove 14 in its periphery. Directly beneath this finger piece 13 and in alignment with the groove 14, the portion 6 of the barrel support 2 is provided with an opening 15 adapted to receive the lower end of a shoe pin 16 carried at one end of a leaf spring 17 anchored at its opposite end as at 18 to the supporting wall 1. The shoe pin 16 has an upwardly extending portion 19 engageable in the groove 14 of the finger piece 14. Obviously, upon rotation of the finger piece 13 to the position shown in Figures 1 and 2, the shoe 16 will be pressed downwardly into tight engagement with the lens mount or holder 5, thus locking the same in position. Rotation of the finger piece 13 out of such position, will, because of the eccentric mounting thereof on the pin 12, permit the spring 17 to raise the shoe 16 out of locking engagement with the holder 5, thus permitting free rotation thereof for focusing.

In assembling a lens in a mount of this character, when the lens has been positioned within the mount, there must be provided an indicating mark of a fixed character or position with which the distance indicating scale 20 on the flange 8 of the focusing mount can cooperate for accurately indicating to the operator the focusing distances. Inasmuch as the focal length of lenses may vary slightly, it is not practical to place such stationary indicating mark always in the same position on the fixed portion of the lens mount. I have provided such an indicating means which may be adjusted to accommodate such variations in focal lengths of different lenses.

This means comprises a thin plate 21 adapted to lie closely against the forward extension 6 of the supporting barrel 2, and having its forward end underlying the flange 8 of the focusing ring 7 as indicated clearly in dotted lines in Figure 2 at 22. The opposite end of this indicating plate 21 is bent at right angles and is provided with a flange portion 23 within which is an arcuate slot 24, through which is adapted to pass a set screw 25 by means of which the flange 23, and consequently the plate 21 may be locked in fixed position with respect to the support 1 and the rotatable focusing member 8. By virtue of the slot 24 however, this plate 21 with its one or more usual indicating marks 26 thereon may be adjusted to the desired or required position to properly cooperate with the scale 20 on the focusing member 8.

Of course, changes may be made in details of construction and arrangement of parts without departing from the spirit and scope of my invention. I do not limit myself, therefore, to the exact form herein shown and described other than by the appended claims.

1. A lens mount comprising a longitudinally adjustable lens holder, a support therefor, and means carried by said support, and including a resilient member engageable with said holder and eccentric means for locking the same in adjusted position.

2. A lens mount comprising a longitudinally adjustable lens holder, a support therefor, and cam means carried by said support and cooperating with said holder for locking the same in adjusted position.

3. A lens mount comprising a longitudinally adjustable lens holder, a support therefor, a locking pin engageable with said holder, resilient means normally urging said pin out of locking position with respect to said holder, and means for moving said pin into locking engagement with said holder.

4. A lens mount comprising a longitudinally adjustable lens holder, a support therefor, a spring secured to said support cooperating with a locking pin engageable with said holder, and means for moving said pin to locking engagement with said holder against the tension of said spring.

5. A lens mount comprising a longitudinally adjustable lens holder, a support therefor, a spring secured to said support cooperating with a locking pin engageable with said holder, and means for moving said pin to locking engagement with said holder against the tension of said spring, said means comprising a rotatable member on said support, engageable with said pin.

6. A lens mount comprising a longitudinally adjustable lens holder, a support therefor, a spring secured to said support cooperating with a locking pin engageable with said holder, and means for moving said pin to locking engagement with said holder against the tension of said spring, said means comprising an eccentrically rotatable member on said support, engageable with said pin.

7. A lens mount comprising a longitudinally adjustable lens holder, a support therefor, a spring secured to said support cooperating with a locking pin engageable with said holder, and means for moving said pin to locking engagement with said holder against the tension of said spring, said means comprising an eccentrically rotatable member on said support, engageable with said pin, said member having a groove therein cooperating with said pin.

8. A lens mount comprising a hollow cylindrical support, a lens holder threaded therein for longitudinal adjustment, a leaf spring on said support and having a pin engageable with said holder through an opening in said support, and means engageable with said pin for moving the same into locking engagement with said holder against the tension of said spring.

9. A lens mount comprising a hollow cylindrical support, a lens holder threaded therein for longitudinal adjustment, a leaf spring on said support and having a pin engageable with said holder through an opening in said support, and means engageable with said pin for moving the same into locking engagement with said holder against the tension of said spring, said means comprising an eccentrically rotatable member on said support engageable with said pin.

10. A lens mount comprising a support, a lens holder rotatably threaded therein for focusing adjustment, a focusing scale on said rotatable holder, an indicating member on said support and extending beneath a portion of said rotatable holder for cooperation with said scale in any position of said holder.

11. A lens mount comprising a support, a lens holder rotatably threaded therein for focusing adjustment, a focusing scale on said rotatable holder, an indicating member on said support and extending beneath a portion of said rotatable holder for cooperation with said scale in any position of said holder, said member being adjustable on said support.

12. A lens mount comprising a support, a lens holder rotatably threaded therein for focusing adjustment, an indicating member adjustably secured to said support and having a portion underlying a portion of said holder, and a scale on said holder portion cooperating with said member.

13. A lens mount comprising a support, a lens holder rotatably threaded therein for focusing adjustment, an indicating member adjustably secured to said support and having a portion underlying a portion of said holder, and a scale on said holder portion cooperating with said member, said member comprising a flat plate provided with an angularly disposed flange and means for adjustably securing said flange to said support.

14. A lens mount comprising a support, a lens holder rotatably threaded therein for focusing adjustment, an indicating member adjustably secured to said support and having a portion underlying a portion of said holder, and a scale on said holder portion cooperating with said member, said member comprising a flat plate provided with an angularly disposed flange and means for adjustably securing said flange to said support, and indicating marks on said plate for cooperation with said scale.

In testimony whereof, I affix my signature.

FREEMAN H. OWENS.